US012496236B2

(12) United States Patent
Liu (10) Patent No.: US 12,496,236 B2
(45) Date of Patent: Dec. 16, 2025

(54) ABSORBENT ARTICLE

(71) Applicant: Kimberly-Clark Worldwide, Inc., Neenah, WI (US)

(72) Inventor: Xiaomin Liu, Shanghai (CN)

(73) Assignee: Kimberly-Clark Worldwide, Inc., Neenah, WI (US)

(*) Notice: Subject to any disclaimer, the term of this patent is extended or adjusted under 35 U.S.C. 154(b) by 1017 days.

(21) Appl. No.: 17/312,507

(22) PCT Filed: Dec. 24, 2018

(86) PCT No.: PCT/CN2018/123118
§ 371 (c)(1),
(2) Date: Jun. 10, 2021

(87) PCT Pub. No.: WO2020/132812
PCT Pub. Date: Jul. 2, 2020

(65) Prior Publication Data
US 2022/0054328 A1 Feb. 24, 2022

(51) Int. Cl.
*A61F 13/496* (2006.01)
*A61F 13/45* (2006.01)
(Continued)

(52) U.S. Cl.
CPC .... *A61F 13/4963* (2013.01); *A61F 13/49001* (2013.01); *A61F 13/5512* (2013.01);
(Continued)

(58) Field of Classification Search
CPC ............ A61F 13/4963; A61F 13/49001; A61F 13/5512; A61F 13/496; A61F 13/58;
(Continued)

(56) References Cited

U.S. PATENT DOCUMENTS 4,619,649 A * 10/1986 Roberts .................. A61F 13/496
604/385.29
D393,713 S 4/1998 Gubbiotti
(Continued)

FOREIGN PATENT DOCUMENTS

| CN | 1147279 C | 4/2004 |
|---|---|---|
| CN | 1870957 A | 11/2006 |

(Continued)

*Primary Examiner* — Catharine L Anderson
*Assistant Examiner* — Quynh Dao Le
(74) *Attorney, Agent, or Firm* — KIMBERLY-CLARK WORLDWIDE, INC.

(57) ABSTRACT

An absorbent article (10) can have a first body panel (20), a second body panel (30), and an absorbent panel (40) spanning between connecting the first body panel (20) and the second body panel (30). The absorbent panel (40) is narrower in width than each of the first body panel (20) and the second body panel (30) and is bonded to at least one of the first body panel (20) and/or second body panel (30) with at least one bond region (102,104) having a first bond strength and at least two bond regions (106,108) having a second bond strength greater than the first bond strength. Following use of the absorbent article (10) by a wearer, the portion of the absorbent panel (40) bonded to the body panel (20,30) with weaker bond strength can be separated from the body panel (20,30). The absorbent article (10) can be reconfigured from a wear configuration into a disposal configuration such that the portion of the material forming the body panel (20,30) which has been separated from the absorbent panel (40) can be inverted over the absorbent article (10).

12 Claims, 6 Drawing Sheets

(51) Int. Cl.
*A61F 13/49* (2006.01)
*A61F 13/551* (2006.01)

(52) U.S. Cl.
CPC .............. *A61F 2013/4531* (2013.01); *A61F 2013/4543* (2013.01); *A61F 2013/49055* (2013.01); *A61F 2013/55125* (2013.01)

(58) Field of Classification Search
CPC .............. A61F 13/539; A61F 13/55125; A61F 13/5515; A61F 13/5517; A61F 2013/4531; A61F 2013/4543; A61F 2013/49055; A61F 2013/49087; A61F 2013/49098; A61F 2013/53908; A61F 2013/588; A61F 2013/5395; A61F 13/551; A61F 2013/55125; A61F 2013/55155; A61F 2013/55195
USPC .................. 604/368, 385.01, 385.19, 356
See application file for complete search history.

(56) References Cited

U.S. PATENT DOCUMENTS

| | | | |
|---|---|---|---|
| D412,982 S | 8/1999 | Wyatt | |
| D431,649 S | 10/2000 | Hunsucker | |
| 6,384,297 B1* | 5/2002 | Colman | A61F 13/47 604/389 |
| D476,741 S | 7/2003 | Childress | |
| D596,287 S | 7/2009 | Tan | |
| 7,569,038 B1 | 8/2009 | Salem, Jr. | |
| D626,220 S | 10/2010 | Oranday | |
| D692,558 S | 10/2013 | Cassano | |
| 11,013,644 B2* | 5/2021 | Roszkowiak | A61F 13/5512 |
| 11,648,157 B2* | 5/2023 | Fukasawa | A61F 13/4963 604/385.16 |
| 11,752,045 B2* | 9/2023 | Johnson | A61F 13/49011 604/391 |
| 2001/0037102 A1* | 11/2001 | Sugito | A61F 13/496 604/385.24 |
| 2002/0004656 A1 | 1/2002 | Khan et al. | |
| 2004/0122401 A1* | 6/2004 | Van Gompel | A61F 13/493 604/385.14 |
| 2004/0122412 A1* | 6/2004 | Morman | A61F 13/5622 604/385.101 |
| 2006/0129119 A1* | 6/2006 | Kistler | A61F 13/5512 604/395 |
| 2012/0215191 A1* | 8/2012 | Takino | A61F 13/496 604/365 |
| 2013/0261586 A1* | 10/2013 | Lee | A61F 13/4755 604/385.01 |
| 2014/0163509 A1* | 6/2014 | Gassner | A61F 13/15747 604/385.16 |
| 2016/0120710 A1* | 5/2016 | Stabelfeldt | A61F 13/51476 604/385.01 |
| 2016/0242971 A1* | 8/2016 | Ekstedt | B65D 65/14 |
| 2017/0087035 A1 | 3/2017 | Amiri | |
| 2017/0246058 A1* | 8/2017 | Barna | A61F 13/84 |
| 2017/0252231 A1* | 9/2017 | Kim | A61F 13/537 |
| 2025/0041129 A1* | 2/2025 | Baderstedt | A61F 13/49466 |

FOREIGN PATENT DOCUMENTS

| | | | | |
|---|---|---|---|---|
| CN | 102046132 A | 5/2011 | | |
| CN | 103282004 A | 9/2013 | | |
| CN | 106038078 A | 10/2016 | | |
| CN | 107405228 A | 11/2017 | | |
| CN | 108366882 A | 8/2018 | | |
| CN | 108472185 A | 8/2018 | | |
| CN | 109069323 A | 12/2018 | | |
| EP | 0888766 B1 | 1/2002 | | |
| EP | 3542766 B1 * | 5/2020 | ....... | A61F 13/15634 |
| GB | 2544557 A | 5/2017 | | |
| JP | 2003153942 A | 5/2003 | | |
| JP | 1571818 S | 3/2017 | | |
| KR | 200477290 Y1 | 5/2015 | | |
| WO | 06054925 A1 | 5/2006 | | |

* cited by examiner

ABSORBENT ARTICLE

BACKGROUND OF THE DISCLOSURE

Products such as absorbent articles are often used to collect and retain human body exudates containing, for example, urine, fecal material, menses and/or blood. Such absorbent articles become soiled after use and need to be disposed of in a hygienic manner. Disposal may include various steps such as folding or rolling of the soiled absorbent article prior to placing the soiled absorbent article into a waste receptacle.

In order to prevent the soiled absorbent article from being unfolding or unrolling, to keep the body exudates contained within the soiled absorbent article, and to minimize unpleasant odor, many absorbent articles have a fastening mechanism such as a tape tab or hook member to maintain the soiled absorbent article in a folded or roiled configuration. However, tape tabs and hooks can be opened which can result in a failure of the soiled absorbent article to remain in a folded or rolled configuration.

As a result, there remains a need for an improved product, such as an absorbent article, which can be folded or rolled following soiling and remain in a folded or rolled configuration for disposal of the soiled absorbent article.

SUMMARY OF THE DISCLOSURE

In various embodiments, an absorbent article can have a longitudinal direction and a transverse direction; a first body panel which can have a first transverse direction end edge and a second transverse direction end edge; a first longitudinal direction side edge and a second longitudinal direction side edge; a first width in the transverse direction between the first longitudinal direction side edge and the second longitudinal direction side edge; a second body panel which can have a third transverse direction end edge and a fourth transverse direction end edge; a third longitudinal direction side edge and a fourth longitudinal direction side edge; a second width in the transverse direction between the third longitudinal direction side edge and the fourth longitudinal direction side edge; an absorbent panel spanning between and connecting each of the first body panel and the second body panel, the absorbent panel can have a fifth transverse direction end edge and a sixth transverse direction end edge; a fifth longitudinal direction side edge and a sixth longitudinal direction side edge; a third width in the transverse direction between the fifth longitudinal direction side edge and the sixth longitudinal direction side edge, the third width smaller than the first width and the second width; a topsheet layer, a backsheet layer, and an absorbent core positioned between the topsheet layer and the backsheet layer; a first region of attachment bonding a first portion of the backsheet layer of the absorbent panel to a first portion of the first body panel, the first region of attachment having a first bond region having a first bond strength; a second region of attachment bonding a second portion of the backsheet layer of the absorbent panel to a first portion of the second body panel, the second region of attaching having a second bond region having a second bond strength which is the same as the first bond strength, a third bond region having a third bond strength, and a fourth bond region having a fourth bond strength which is the same as the third bond strength, wherein the third bond strength and the fourth bond strength are each greater than the first bond strength and the second bond strength.

In various embodiments, the first body panel is bonded to the second body panel at a first longitudinal direction side seam and a second longitudinal direction side seam. In various embodiments, each of the first longitudinal direction side seam and the second longitudinal direction side seam are frangible.

In various embodiments, an adhesive is utilized to bond the first portion of the absorbent panel to the first portion of the first body panel and to bond the second portion of the absorbent panel to the first portion of the second body panel. In various embodiments, the same adhesive is utilized in each of the first bond region, the second bond region, the third bond region, and the fourth bond region. In various embodiments, the amount of adhesive present in each of the first bond region and the second bond region is from 0 gsm to 3 gsm. In various embodiments, the amount of adhesive present in each of the third bond region and the fourth bond region is from 5 gsm to 10 gsm.

In various embodiments, a first adhesive is utilized in each of the first bond region and the second bond region and a second adhesive is utilized in each of the third bond region and the fourth bond region wherein the second adhesive is different from the first adhesive.

In various embodiments, the second region of attachment further comprises an adhesive-free region.

In various embodiments, the third width of the absorbent panel is less than 60% of the first width of the first body panel and less than 60% of the second width of the second body panel.

In various embodiments, the third bond region has a fourth width which is at least 10% of the third width of the absorbent panel and wherein the fourth bond region has a fifth width which is at least 10% of the third width of the absorbent panel.

In various embodiments, the adhesive-free region has a sixth width which is at least 10% of the third width of the absorbent panel.

Repeat use of reference characters in the present specification and drawings is intended to represent the same or analogous features or elements of the disclosure.

DETAILED DESCRIPTION OF THE DISCLOSURE

The present disclosure is generally directed towards an absorbent article which is formed from three panels. The absorbent article can have a first body panel, a second body panel, and an absorbent panel spanning between and connecting the first body panel and the second body panel. The absorbent panel is narrower in width than each of the first body panel and the second body panel and is bonded to at least one of the first body panel and/or second body panel in a region of attachment having at least one bond region having a first bond strength and at least two bond regions having a second bond strength greater than the first bond strength. Following use of the absorbent article by a wearer, within the region of attachment the portion of the absorbent panel bonded to the body panel with the weaker bond strength can be separated from the body panel. The absorbent article can be reconfigured from a wear configuration into a disposal configuration when the absorbent article is placed into a rolled configuration and the portion of the material forming the body panel which has been separated from the absorbent panel is inverted over the rolled-up absorbent article.

Definitions

As used herein, the term "absorbent article" refers herein to an article which may be placed against or in proximity to the body (i.e., contiguous with the body) of the wearer to absorb and contain various liquid, solid, and semi-solid exudates discharged from the body. Such absorbent articles, as described herein, are intended to be discarded after a limited period of use instead of being laundered or otherwise restored for reuse. It is to be understood that the present disclosure is applicable to various disposable absorbent articles, including, but not limited to, diapers, training pants, youth pants, swim pants, and incontinence pants.

As used herein, the term "airlaid" refers herein to a web manufactured by an airlaying process. In the airlaying process, bundles of small fibers having typical lengths ranging from about 3 to about 52 mm are separated and entrained in an air supply and then deposited onto a forming screen, usually with the assistance of a vacuum supply. The randomly deposited fibers are then bonded to one another using, for example, hot air to activate a binder component or a latex adhesive. Airlaying is taught in, for example, U.S. Pat. No. 4,640,810 to Laursen, et al., which is incorporated herein in its entirety by reference thereto for all purposes.

As used herein, the term "bonded" refers herein to the joining, adhering, connecting, attaching, or the like, of two elements. Two elements will be considered bonded together when they are joined, adhered, connected, attached, or the like, directly to one another or indirectly to one another, such as when bonded to an intermediate element. The bonding can occur via, for example, adhesive, pressure bonding, thermal bonding, ultrasonic bonding, stitching, suturing, and/or welding.

As used herein, the term "bonded carded web" refers herein to webs that are made from staple fibers which are sent through a combing or carding unit which separates or breaks apart and aligns the staple fibers in the machine direction to form a generally machine direction oriented fibrous nonwoven web. This material may be bonded together by methods that can include point bonding, through air bonding, ultrasonic bonding, adhesive bonding, etc.

As used herein, the term "coform" refers herein to composite materials comprising a mixture or stabilized matrix of thermoplastic fibers and a second non-thermoplastic material. As an example, coform materials may be made by a process in which at least one meltblown die head is arranged near a chute through which other materials are added to the web while it is forming. Such other materials may include, but are not limited to, fibrous organic materials such as woody or non-woody pulp such as cotton, rayon, recycled paper, pulp fluff, and also superabsorbent particles, inorganic and/or organic absorbent materials, treated polymeric staple fibers and so forth. Some examples of such coform materials are disclosed in U.S. Pat. No. 4,100,324 to Anderson, et al., U.S. Pat. No. 4,818,464 to Lau, U.S. Pat. No. 5,284,703 to Everhart, et al., and U.S. Pat. No. 5,350,624 to Georger, et al., each of which are incorporated herein in their entirety by reference thereto for all purposes.

As used herein, the term "conjugate fibers" refers herein to fibers which have been formed from at least two polymer sources extruded from separate extruders and spun together to form one fiber Conjugate fibers are also sometimes referred to as bicomponent fibers or multicomponent fibers. The polymers are arranged in substantially constantly positioned distinct zones across the cross-sections of the conjugate fibers and extend continuously along the length of the conjugate fibers. The configuration of such a conjugate fiber may be, for example, a sheath/core arrangement where one polymer is surrounded by another, or may be a side-by-side arrangement, a pie arrangement, or an "islands-in-the-sea" arrangement. Conjugate fibers are taught by U.S. Pat. No. 5,108,820 to Kaneko, et al., U.S. Pat. No. 4,795,668 to Krueger, et al., U.S. Pat. No. 5,540,992 to Marcher, et al., U.S. Pat. No. 5,336,552 to Strack, et al., U.S. Pat. No. 5,425,987 to Shawver, and U.S. Pat. No. 5,382,400 to Pike, et al, each being incorporated herein in their entirety by reference thereto for ail purposes. For two component fibers, the polymers may be present in ratios of 75/25, 50/50, 25/75 or any other desired ratio. Additionally, polymer additives such as processing aids may be included in each zone.

As used herein, the term "film" refers to a thermoplastic film made using an extrusion and/or forming process, such as a cast film or blown film extrusion process. The term includes aperture films, slit film, and other porous films which constitute liquid transfer films, as well as films which do not transfer fluids, such as, but not limited to, barrier films, filled films, breathable films, and oriented films.

As used herein, the term "hydrophilic" refers to surfaces with a water contact angle at or below 90°.

As used herein, the term "hydrophobic" refers to surfaces with the property to repel fluid with a water contact angle at or greater than 90°.

As used herein, the term "liquid impermeable" refers to a layer or multi-layer laminate in which liquid body exudates, such as urine, will not pass through the layer or laminate, under ordinary use conditions, in a direction generally perpendicular to the plane of the layer or laminate at the point of liquid contact.

As used herein, the term "liquid permeable" refers herein to any material that is not liquid impermeable.

As used herein, the term "machine direction" (MD) refers to the length of a fabric in the direction in which it is produced, as opposed to a "cross-machine direction" (CD) which refers to the width of a fabric in a direction generally perpendicular to the machine direction.

As used herein, the term "meltblown web" refers herein to a nonwoven web that is formed by a process in which a molten thermoplastic material is extruded through a plurality of fine, usually circular, die capillaries as molten fibers into converging high velocity gas (e.g., air) streams that attenuate the fibers of molten thermoplastic material to reduce their diameter, which may be to microfiber diameter, Thereafter, the meltblown fibers are carried by the high velocity gas stream and are deposited on a collecting surface to form a web of randomly disbursed meltblown fibers, Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 microns in diameter, and generally tacky when deposited onto a collecting surface.

As used herein, the term "nonwoven fabric" or "nonwoven web" refers herein to a web having a structure of individual fibers or threads which are interlaid, but not in an identifiable manner as in a knitted fabric, Nonwoven fabrics or webs have been formed from many processes such as, for example, meltblowing processes, spunbonding processes, through-air bonded carded web (also known as BOW and TABCW) processes, etc. The basis weight of nonwoven webs may generally vary, such as, from about 5, 10 or 20 gsm to about 120, 125 or 150 gsm.

As used herein, the term "spunbond web" refers herein to a web containing small diameter substantially continuous fibers. The fibers are formed by extruding a molten thermoplastic material from a plurality of fine, usually circular, capillaries of a spinneret with the diameter of the extruded fibers then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are each incorporated herein in their entirety by reference thereto for all purposes. Spunbond fibers are generally not tacky when they are deposited onto a collecting surface, Spunbond fibers may sometimes have diameters less than about 40 microns, and often between about 5 to about 20 microns.

As used herein, the terms "superabsorbent polymer," "superabsorbent" or "SAP" shall be used interchangeably and shall refer to polymers that can absorb and retain extremely large amounts of a liquid relative to their own mass. Water absorbing polymers, which are classified as hydrogels, which can be cross-linked, absorb aqueous solutions through hydrogen bonding and other polar forces with water molecules. A SAP's ability to absorb water is based in part on ionicity (a factor of the ionic concentration of the aqueous solution), and the SAP functional polar groups that have an affinity for water. SAP are typically made from the polymerization of acrylic acid blended with sodium hydroxide in the presence of an initiator to form a poly-acrylic acid sodium salt (sometimes referred to as sodium polyacrylate). Other materials are also used to make a superabsorbent polymer, such as polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile. SAP may be present in absorbent articles in particle or fibrous form or as a coating on another material or fiber.

Absorbent Article:

The present disclosure is generally directed towards an absorbent article which is formed from three panels. The absorbent article can have a first body panel, a second body panel, and an absorbent panel spanning between and connecting the first body panel and the second body panel. The absorbent panel is narrower in width than each of the first body panel and the second body panel and is bonded to at least one of the first body panel and/or second body panel in a region of attachment having at least one bond region having a first bond strength and at least two bond regions having a second bond strength greater than the first bond strength. Following use of the absorbent article by a wearer, within the region of attachment the portion of the absorbent panel bonded to the body panel with the weaker bond strength can be separated from the body panel. The absorbent article can be reconfigured from a wear configuration into a disposal configuration when the absorbent article is placed into a rolled configuration and the portion of the material forming the body panel which has been separated from the absorbent panel is inverted over the rolled-up absorbent article.

Figure 1:
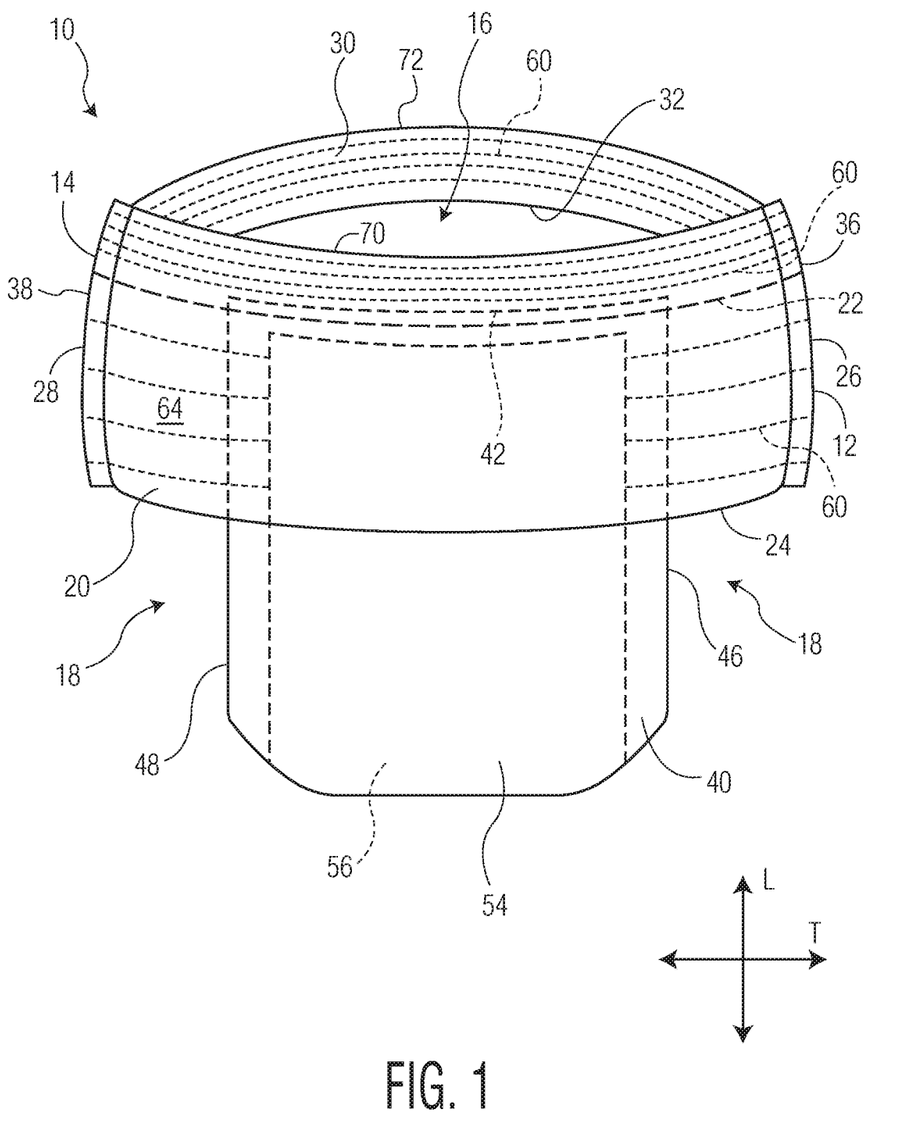
FIG. 1 is a front view of an embodiment of an absorbent article in a wear configuration.
Figure 2:
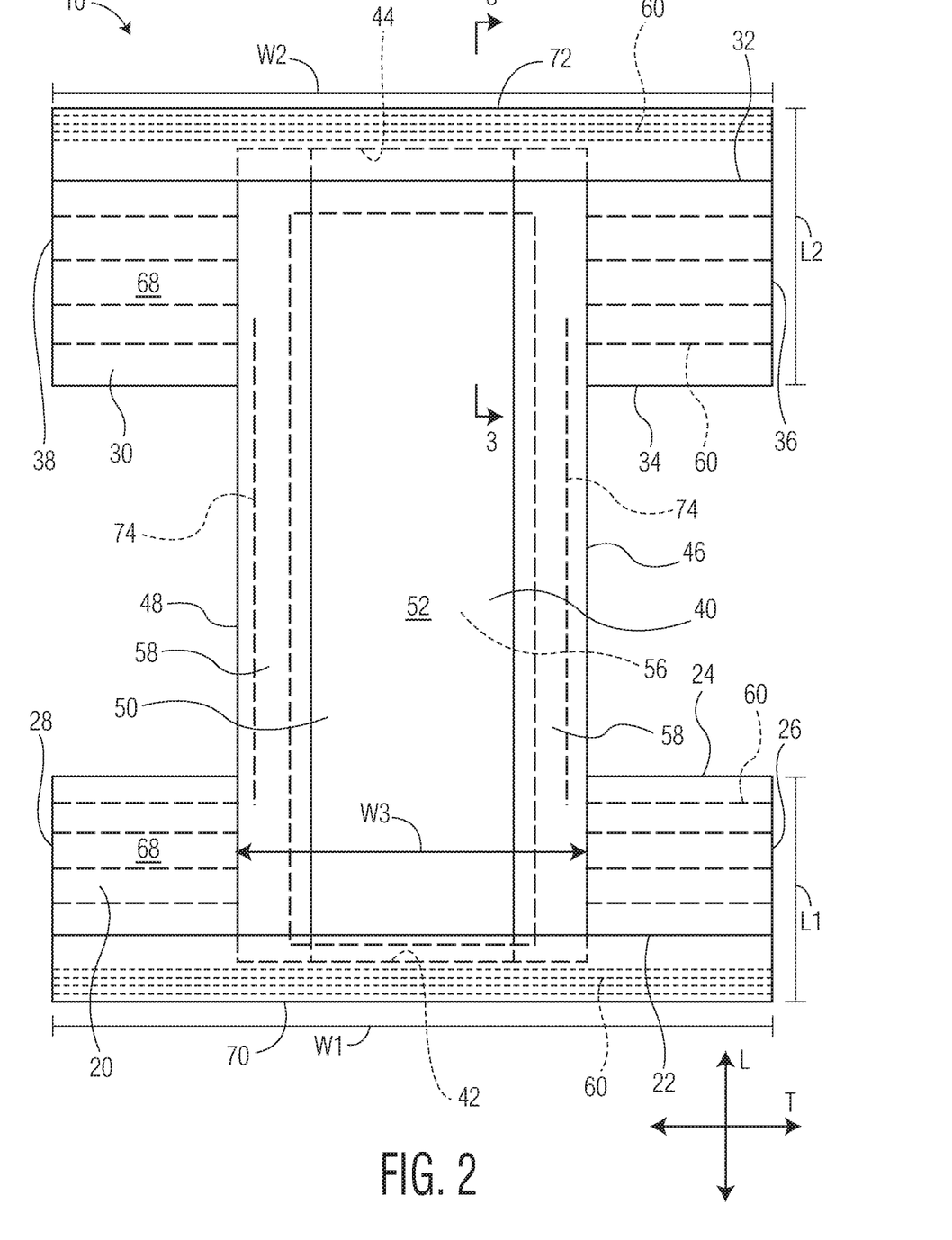
FIG. 2 is a top down plan view of an embodiment of an absorbent article in an open, stretched, and laid flat configuration.

Referring to FIGS. 1 and 2, FIG. 1 provides an illustration of a front view of an absorbent article 10 in a wear configuration and FIG. 2 provides an illustration of a top down plan view of the absorbent article 10 of FIG. 1 in an open, stretched, and laid flat configuration. The absorbent article 10 can have a longitudinal direction (L) and a transverse direction (T) The absorbent article 10 can be formed from three panels. The absorbent article 10 can have a first body panel 20 and a second body panel 30 which is separate from and spaced apart from, in the longitudinal direction (L), the first body panel 20. An absorbent panel 40 can span between and connect each of the first body panel 20 and the second body panel 30. In the wear configuration, the first body panel 20 and the second body panel 30 can be bonded to each other at a pair of longitudinal direction side seams, 12 and 14. The side seams, 12 and 14, can be formed through mechanical means, such as through application of ultrasonic energy, pressure energy, or heat energy, or combinations thereof. In various embodiments, the side seams, 12 and 14, are frangible such that they can be easily torn in the process of changing the configuration of the absorbent article 10 from a wear configuration to a disposal configuration.

The wear configuration of the absorbent article 10 provides a waist opening 16 and a pair of leg openings 18. In the wear configuration, one of the body panels, 20 or 30, can be worn on the anterior region of the body of the wearer while the other of the body panels, 20 or 30, can be worn on the posterior region of the body of the wearer and the absorbent panel 40 can be positioned between the legs of the wearer to capture body exudates from the wearer of the absorbent article 10. Following use of the absorbent article 10, the wearer can at least partially separate a portion of the absorbent panel 40 from one of the body panels, 20 or 30, to form a pocket 100 between the absorbent panel 40 and the material forming the body panel, 20 or 30, respectively. The wearer can reconfigure the absorbent article 10 such as by folding or rolling the absorbent article 10 into a smaller dimensional configuration than the unfolded or unrolled absorbent article 10 and the body panel material forming the pocket 100 can be inverted over the reconfigured absorbent article 10 to place the absorbent article 10 in a disposal configuration.

Body Panels:

The first body panel 20 can have a first transverse direction end edge 22 and a second transverse direction end edge 24 spaced apart from the first transverse direction end edge 22 in the longitudinal direction (L). The first body panel 20 can also have a first longitudinal direction side edge 26 and a second longitudinal direction side edge 28 spaced apart from the first longitudinal direction side edge 26 in the transverse direction (Ty Each of the longitudinal direction side edges, 26 and 28, extend between and connect the first transverse direction end edge 22 and the second transverse direction end edge 24. The first body panel 20 can have a transverse direction width W1 defined as the distance between the first longitudinal direction side edge 26 and the second longitudinal direction side edge 28.

The second body panel 30 can have a first transverse direction end edge 32 and a second transverse direction end edge 34 spaced apart from the first transverse direction end edge 32 in the longitudinal direction (L). The second body panel 30 can also have a first longitudinal direction side edge 36 and a second longitudinal direction side edge 38 spaced apart from the first longitudinal direction side edge 36 in the transverse direction (T). Each of the longitudinal direction side edges, 36 and 38, extend between and connect the first transverse direction end edge 32 and the second transverse direction end edge 34. The second body panel 30 can have a transverse direction width W2 defined as the distance between the first longitudinal direction side edge 36 and the second longitudinal direction side edge 38. In various embodiments, width W1 of the first body panel 20 is the same as width W2 of the second body panel 30. In various embodiments, width W1 of the first body panel 20 is greater than width W2 of the second body panel 30. In various embodiments width W1 of the first body panel 20 is smaller than width W2 of the second body panel 30.

As illustrated in each of the Figures, the first body panel 20 and the second body panel 30 can each have a length, L1 and L2, respectively, in the longitudinal direction (L) extending from their second transverse direction end edges, 24 and 34, respectively, to a fold in the material forming each of the first body panel 20 and second body panel 30, such as, for example, fold 70 in the first body panel and fold 72 in the second body panel 30. In the embodiments illustrated in Figures, the first transverse direction end edges, 22 and 32, respectively, of each of the materials forming each of the first body panel 20 and the second body panel 30, is positioned, in the longitudinal direction (L), between the folds, 70 and 72, respectively, and the second transverse direction end edges, 24 and 34, respectively, of each of the first body panel 20 and the second body panel 30. In various embodiments, folding the material forming each of the first body panel 20 and the second body panel 30 is not required and, therefore, each of the first body panel 20 and the second body panel 30 would have a longitudinal direction (L) length, L1 and L2, respectively, extending from the second transverse direction end edges, 24 and 34, respectively, to each of the first transverse direction end edges, 22 and 32, respectively.

Figure 3:
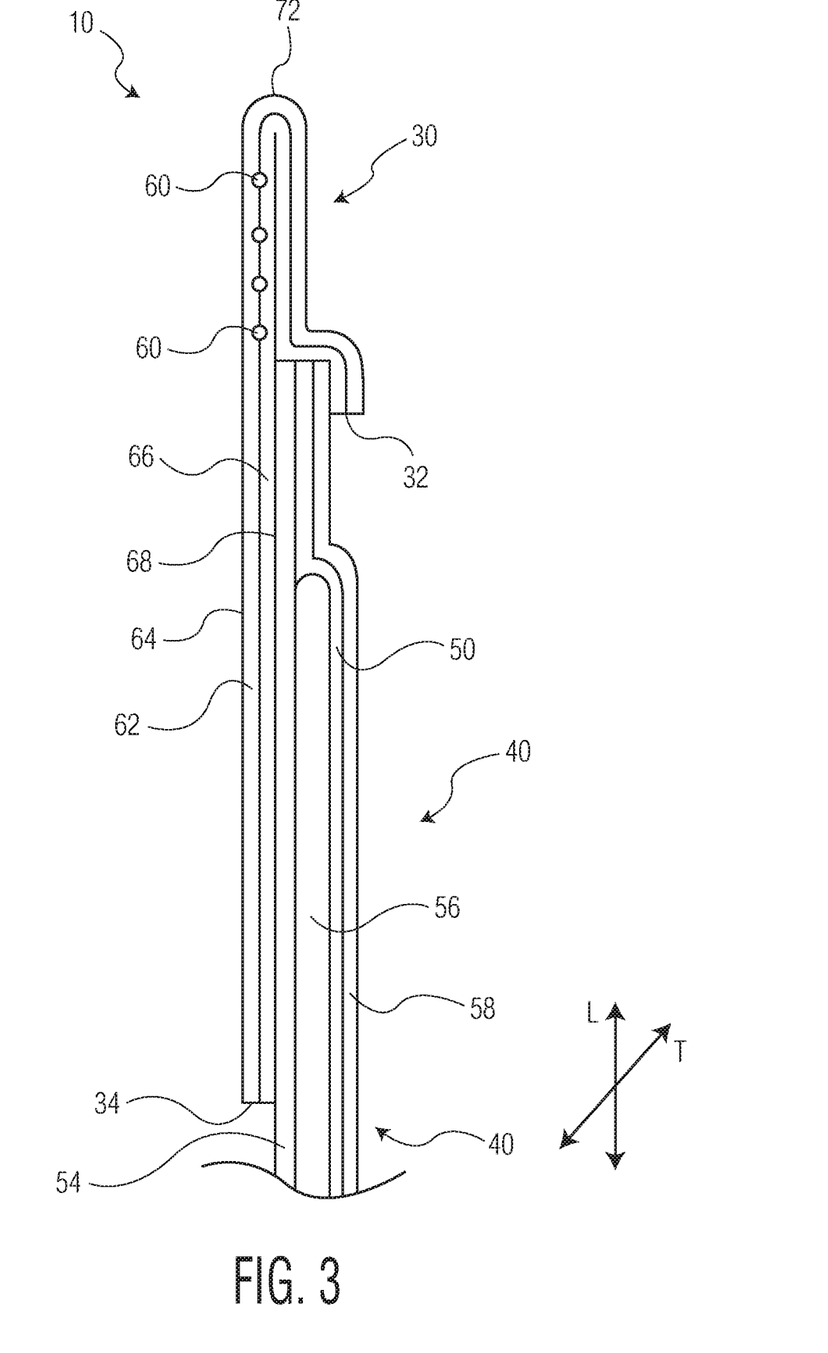
FIG. 3 is a cross-sectional view of a portion of the absorbent article of FIG. 2 taken along line 3-3.

Each of the first body panel 20 and the second body panel 30 are generally at least partially elasticized materials. Each of the first body panel 20 and the second body panel 30 may generally comprise a plurality of layers of material with one or more elastic elements 60 sandwiched between the layers. FIG. 3 illustrates an exemplary embodiment of a cross-sectional view of a portion of the absorbent article 10 of FIG. 2 taken along line 3-3. As can be seen in the illustration of FIG. 3, a body panel, such as, for example, the second body panel 30, can be formed from multiple layers. For example, as illustrated, the second body panel 30 can have a garment-facing layer 62 providing a garment facing surface 64 and an absorbent panel facing layer 66 providing an absorbent panel facing surface 68. While only the second body panel 30 is illustrated in FIG. 3, the first body panel 20 can be similarly configured to have a garment facing layer 62 providing a garment facing surface 64 and an absorbent panel facing layer 66 providing an absorbent panel facing surface 68.

In various embodiments, the garment facing layer of each of the first body panel 20 and the second body panel 30 can be formed from any suitable fibrous nonwoven web. For example, in various embodiments, the garment facing layer of each of the first body panel 20 and the second body panel 30 can be formed from nonwoven webs such as staple fiber webs and more continuous fiber or filament fiber webs such as are found in meltblown webs or spunbond webs. Through air bonded carded staple fiber webs may also be suitable for the garment facing layer of each of the first body panel 20 and the second body panel 30 as such fibers as bicomponent fibers can be used which include polyethylene-based polymers for the sheaths to provide a softer feel and hand, while the cores of the bicomponent fibers can be made from such polymers as polypropylene and polyester to provide other properties such as rigidity and compression resilience. In various embodiments, the absorbent panel facing layer of each of the first body panel 20 and the second body panel 30 can be made from any of the same materials as the garment facing layer of each of the first body panel 20 and the second body panel 30. In various embodiments, the absorbent panel facing layer can be made from spunbond webs or combinations of spunbond and meltblown webs which are typically made from polypropylene-based polymers. In various embodiments, the basis weight of each of the first body panel 20 and the second body panel 30 may be from about 10 or 15 gsm to about 35, 50 or 100 gsm.

Elastic elements 60 can be positioned between the garment facing layer 62 and the absorbent panel facing layer 66. Although illustrated as elastic strands in the Figures, the elastic elements 60 may be elastic strands, elastic ribbons, elastics sheets, or elastic film. The elastic elements 60 can have spandex, natural or synthetic rubber, thermoplastic elastic materials, or heat activated elastic materials. In various embodiments, the elastic elements 60 can be any elastomeric material capable of being elongated at least about 50%, and in various embodiments at least about 350%, and capable of recovering to within at least about 250%, and in various embodiments at least about 150% of its original length after being elongated.

As the third panel of the absorbent article 10, an absorbent panel 40 can span between and connect the first body panel 20 and the second body panel 30. The absorbent panel 40 can have a first transverse direction end edge 42 and a second transverse direction end edge 44 spaced apart from, in the longitudinal direction (L), the first transverse direction end edge 42. The absorbent panel 40 can also have a first longitudinal direction side edge 46 and a second longitudinal direction side edge 48 spaced apart from, in the transverse direction (T), the first longitudinal direction side edge 46. Each of the longitudinal direction side edges, 46 and 48, extend between and connect the first transverse direction end edge 42 and the second transverse direction end edge 44. The absorbent panel 40 can have a transverse direction width W3 defined as the distance between the first longitudinal direction side edge 46 and the second longitudinal direction side edge 48. In various embodiments, width W3 of the absorbent panel 40 is smaller than each of width W1 of the first body panel 20 and W2 of the second body panel 30. In various embodiments, width W3 of the absorbent panel 40 is less than 60, 55, or 52% of each of width W1 of the first body panel 20 and width W2 of the second body panel 30.

In general, the absorbent panel 40 can have a wearer facing, liquid permeable topsheet layer 50 and a garment facing, liquid impermeable backsheet layer 54. An absorbent core 56 can be positioned between the topsheet layer 50 and the backsheet layer 54. The topsheet layer 50 and the backsheet layer 54 can both extend beyond the outermost peripheral edges of the absorbent core 56 and can be peripherally bonded together, either entirely or partially, using known bonding techniques to form a sealed peripheral region. For example, the topsheet layer 50 and the backsheet layer 54 can be bonded together by adhesive bonding, ultrasonic bonding, or any other suitable bonding method known in the art.

The topsheet layer 50 defines a wearer facing surface of the absorbent panel 40 that may directly contact the body of the wearer and is liquid permeable to receive body exudates. The topsheet layer 50 is desirably provided for comfort and conformability and functions to direct body exudates away from the body of the wearer, through its own structure, and towards the absorbent core 56. The topsheet layer 50 desirably retains little to no liquid in its structure, so that it provides a relatively comfortable and non-irritating surface next to the skin of the wearer of the absorbent article 10.

The topsheet layer 50 can be constructed of any woven, nonwoven, or film sheet material which is easily penetrated by bodily exudates which may contact the body-facing surface 52 of the topsheet layer 50. In various embodiments, the topsheet layer 50 can be constructed from various nonwoven webs such as meltblown webs, spunbond webs, hydroentangled spunlace webs, or through air bonded carded webs. Examples of suitable topsheet layer 50 materials can include, but are not limited to, natural fiber webs (such as cotton), rayon, hydroentangled webs, bonded carded webs of polyester, polypropylene, polyethylene, nylon, or other heat-bondable fibers (such as bicomponent fibers), polyolefins, copolymers of polypropylene and polyethylene, linear low-density polyethylene, and aliphatic esters such as polylactic acid. Finely perforated films and net materials can also be used, as can laminates of/or combinations of these materials. An example of a material suitable for use as a topsheet layer 50 is a perforated polyethylene film material. An example of a suitable topsheet layer 50 can be a bonded carded web made of polypropylene and polyethylene such as that obtainable from Sandler Corporation, Germany. U.S. Pat. No. 4,801,494 to Datta, et al., and U.S. Pat. No. 4,908,026 to Sukiennik, et al., and WO 2009/062998 to Texol teach various other materials that may be used as the topsheet layer 50, each of which is hereby incorporated by reference thereto in its entirety. Additional topsheet layer 50 materials can include, but are not limited to, those described in U.S. Pat. No. 4,397,644 to Matthews, et al., U.S. Pat. No. 4,629,643 to Curro, et al., U.S. Pat. No. 5,188,625 to Van Iten, et al., U.S. Pat. No. 5,382,400 to Pike, et al., U.S. Pat. No. 5,533,991 to Kirby, et al., U.S. Pat. No. 6,410,823 to Daley, et al., and U.S. Publication No. 2012/0289917 to Abuto, et al., each of which is hereby incorporated by reference thereto in its entirety.

In various embodiments, the topsheet layer 50 may contain a plurality of apertures (not shown) formed therethrough to permit body exudates to pass more readily into the absorbent core 56. The apertures may be randomly or uniformly arranged throughout the topsheet layer 50 or they may be located in a narrow longitudinal band or strip arranged along the longitudinal centerline of the absorbent article 10. The size, shape, diameter, and number of apertures may be varied to suit an absorbent article's 10 particular needs.

In various embodiments, the topsheet layer 50 can have a basis weight ranging from about 5, 10, 15, 20 or 25 gsm to about 50, 100, 120, 125 or 150 gsm. For example, in an embodiment, a topsheet layer 50 can be constructed from a through air bonded carded web having a basis weight ranging from about 15 gsm to about 100 gsm. In another example, a topsheet layer 50 can be constructed from a through air bonded carded web having a basis weight from about 20 gsm to about 50 gsm, such as a through air bonded carded web that is readily available from nonwoven material manufacturers, such as Xiamen Yanjan Industry, Beijing, DaYuan Nonwoven Fabrics and others. Alternatively, apertured films, such as those available from such film suppliers as Texol, Italy and Tredegar, U.S.A. may be utilized. In various embodiments, the topsheet layer 50 can be constructed from a perforated polyethylene film having a basis weight from about 15 gsm to about 30 gsm. In various embodiments, the topsheet layer 50 can be constructed from a cotton material and have a basis weight from about 25 gsm to about 35 gsm.

In various embodiments, the topsheet layer 50 is hydrophilic. The topsheet layer 50 can be formed from a material which is inherently hydrophilic or can be formed from a hydrophobic material which has then been treated with a hydrophilic coating such as, for example, a surfactant treatment.

An absorbent core 56 can be positioned between the topsheet layer 50 and the backsheet layer 54. The absorbent core 56 can generally be any single layer structure or combination of layer components, which can demonstrate some level of compressibility, conformability, be non-irritating to a wearers skin, and capable of absorbing and retaining liquids and other body exudates. In various embodiments, the absorbent core 56 can be formed from a variety of different materials and can contain any number of desired layers. For example, the absorbent core 56 can include one or more layers (e.g., two layers) of absorbent web material of cellulosic fibers (e.g., wood pulp fibers), other natural fibers, synthetic fibers, woven or nonwoven sheets, scrim netting, or other stabilizing structures, superabsorbent material, binder materials, surfactants, selected hydrophobic and hydrophilic materials, pigments, lotions, odor control agents or the like, as well as combinations thereof. In an embodiment, the absorbent web material can include a matrix of cellulosic fluff and can also include superabsorbent material. The cellulosic fluff can comprise a blend of wood pulp fluff. An example of a wood pulp fluff can be identified with the trade designation NB 416, available from Weyerhaeuser Corp., and is a bleached, highly absorbent wood pulp containing primarily soft wood fibers.

In various embodiments, if desired, the absorbent core 56 can include an optional amount of superabsorbent material. Examples of suitable superabsorbent material can include poly(acrylic acid), poly(methacrylic acid), poly(acrylamide), poly(vinyl ether), maleic anhydride copolymers with vinyl ethers and α-olefins, poly(vinyl pyrrolidone), poly (vinylmorpholinone), poly(vinyl alcohol), and salts and copolymers thereof. Other superabsorbent materials can include unmodified natural polymers and modified natural polymers, such as hydrolyzed acrylonitrile-grafted starch, acrylic acid grafted starch, methyl cellulose, chitosan, carboxymethyl cellulose, hydroxypropy cellulose, and natural gums, such as alginates, xanthan gum, locust bean gum, and so forth. Mixtures of natural and wholly or partially synthetic superabsorbent polymers can also be useful. The superabsorbent material can be present in the absorbent core 56 in any amount as desired.

Regardless of the combination of absorbent materials used in the absorbent core 56, the absorbent materials can be formed into a web structure by employing various conventional methods and techniques. For example, the absorbent web can be formed by techniques such as, but not limited to, a dry-forming technique, an air forming technique, a wet forming technique, a foam forming technique, or the like, as well as combinations thereof. A coform nonwoven material can also be employed. Methods and apparatus for carrying out such techniques are well known in the art.

The shape of the absorbent core 56 can vary as desired and can comprise any one of various shapes including, but not limited to, triangular, rectangular, dog-bone and elliptical shapes. In various embodiments, the absorbent core 56 can have a shape that generally corresponds with the overall shape of the absorbent panel 40. The dimensions of the absorbent core 56 can be substantially similar to those of the absorbent panel 40, however, it will be appreciated that the dimensions of the absorbent core 56 while similar, will often be less than those of the overall absorbent panel 40, in order to be adequately contained therein.

By way of example, suitable materials and/or structures for the absorbent core 56 can include, but are not limited to, those described in U.S. Pat. No. 4,610,678 to Weisman, et al., U.S. Pat. No. 6,060,636 to Yahiaoui, et al., U.S. Pat. No. 6,610,903 to Latimer, et al., U.S. Pat. No. 7,358,282 to Krueger, et al., and U.S. Publication No. 2010/0174260 to Di Luccio, et al., each of which is hereby incorporated by reference thereto in its entirety.

As described above, in various embodiments, an absorbent core 56 can be a single layer structure and can include, for example, a matrix of cellulosic fluff and superabsorbent material. In various embodiments, an absorbent core 56 can have at least two layers of material, such as, for example, a body facing layer and a garment facing layer. In various embodiments, the two layers can be identical to each other. In various embodiments, the two layers can be different from each other. In such embodiments, the two layers can provide the absorbent article 10 with different absorption properties as deemed suitable. In various embodiments, the body facing layer of the absorbent core 56 may be constructed of an airlaid material and the garment facing layer of the absorbent core 56 may be constructed of a superabsorbent polymer-containing compressed sheet. In such embodiments, the airlaid material can have a basis weight from about 40 to about 200 gsm and the superabsorbent polymer-containing compressed sheet can be a cellulosic fluff based material that can be a combination of cellulosic pulp and SAP enclosed with a tissue carrier and having a basis weight from about 40 to about 400 gsm.

The backsheet layer 54 is generally liquid impermeable and is the portion of the absorbent panel 40 which faces the garment of the wearer. The backsheet layer 54 can permit the passage of air or vapor out of the absorbent panel 40 while still blocking the passage of liquids. Any liquid impermeable material may generally be utilized to form the backsheet layer 54. The backsheet layer 54 can be composed of a single layer or multiple layers, and these one or more layers can themselves comprise similar or different materials. Suitable material that may be utilized can be a microporous polymeric film, such as a polyolefin film of polyethylene or polypropylene, nonwovens and nonwoven laminates, and film/nonwoven laminates. The particular structure and composition of the backsheet layer 54 can be selected from various known films and/or fabrics with the particular material being selected as appropriate to provide the desired level of liquid barrier, strength, abrasion resistance, tactile properties, aesthetics and so forth. In various embodiments, a polyethylene film can be utilized that can have a thickness in the range of from about 0.2 or 0.5 mils to about 3.0 or 5.0 mils. An example of a backsheet layer 54 can be a polyethylene film such as that obtainable from Pliant Corporation, Schaumburg, IL, USA. Another example can include calcium carbonate-filled polypropylene film. In still another embodiment, the backsheet layer 54 can be a hydrophobic nonwoven material with water barrier properties such as a nonwoven laminate, an example of which can be a spunbond, meltblown, meltblown, spunbond, four-layered laminate. The backsheet layer 54 can, therefore, be of a single or multiple layer construction, such as of multiple film layers or laminates of film and nonwoven fibrous layers. Suitable backsheet layers 54 can be constructed from materials such as those described in U.S. Pat. No. 4,578,069 to Whitehead, et al., U.S. Pat. No. 4,376,799 to Tusim, et al., U.S. Pat. No. 5,695,849 to Shawver, et al., U.S. Pat. No. 6,075,179 to McCormack, et al., and U.S. Pat. No. 6,376,095 to Cheung, et al., each of which are hereby incorporated by reference thereto in its entirety.

The absorbent panel 40 can also have a pair of containment flaps 58 to help retain body exudates within the absorbent panel 40. In various embodiments, the containment flaps 58 can be of various configurations and shapes and can be constructed by various methods. For example, the containment flaps 58 can be similar to those containment flaps described in U.S. Pat. No. 5,895,382 to Popp, et al., U.S. Pat. No. 9,168,181 to Popp, et al., and U.S. Pat. No. 9,259,362 to Popp, et al., each of which are hereby incorporated by reference thereto in its entirety. The containment flaps 58 can be constructed of a fibrous material which can be similar to the material forming the topsheet layer 50, including, but not limited to a spunbond-meltblown-spunbond ("SMS") material. Other conventional materials including multiple layers of film and/or nonwovens can be used to form the containment flap material.

The containment flaps 58 can include one or more flap elastic members (not shown), such as, 1, 2, 3, or more flap elastic members. The flap elastic members can be located adjacent a flap distal edge, but they can also be located in any other portion of the containment flaps 58 including adjacent a flap proximal portion and a flap medial portion.

The absorbent panel 40 can further include leg elastic members 74 which can be secured to the backsheet layer 54, such as by being bonded thereto by adhesive, generally transversely inward of the longitudinal direction side edges, 46 and 48, of the absorbent panel 40. The leg elastic members 74 can form elasticized leg cuffs that further help to contain body exudates in the absorbent panel 40. In various embodiments, the leg elastic members 74 may be disposed between inner and outer layers of the backsheet layer 55, or between other layers of the absorbent panel 40 such as, for example, the topsheet layer 50 and the backsheet layer 54. A wide variety of elastic materials can be used for the leg elastic members 74. Suitable elastic materials can include sheets, strands or ribbons of natural rubber, synthetic rubber, or thermoplastic elastomeric materials. The elastic materials can be stretched and secured to a substrate, secured to a gathered substrate, or secured to a substrate and then elasticized or shrunk, for example, with the application of heat, such that the elastic retractive forces are imparted to the substrate. Additionally, it is contemplated that the leg elastic members 74 can be formed with the containment flaps 58, and then attached to the absorbent panel 40 in some embodiments. In various embodiments, the leg elastic members 74 can be omitted from the absorbent panel 40 without departing the scope of this disclosure.

To form the absorbent article 10, a first portion of the absorbent panel 40 can overlap and be bonded to a portion of the first body panel 20 and a second portion of the absorbent panel 40 can overlap and be bonded to a portion of the second body panel 30. In such embodiments, the backsheet layer 54 of the absorbent panel 40 is bonded to the absorbent panel facing layer 66 of each of the first body panel 20 and the second body panel 30. In various embodiments, the elastic elements 60 of each of the first body panel 20 and the second body panel 30 can overlap the absorbent core 56 of the absorbent panel 40, In various embodiments, the elastic elements 60 of each of the first body panel 20 and the second body panel 30 may not overlap the absorbent core 56 of the absorbent panel 40.

Figure 4:
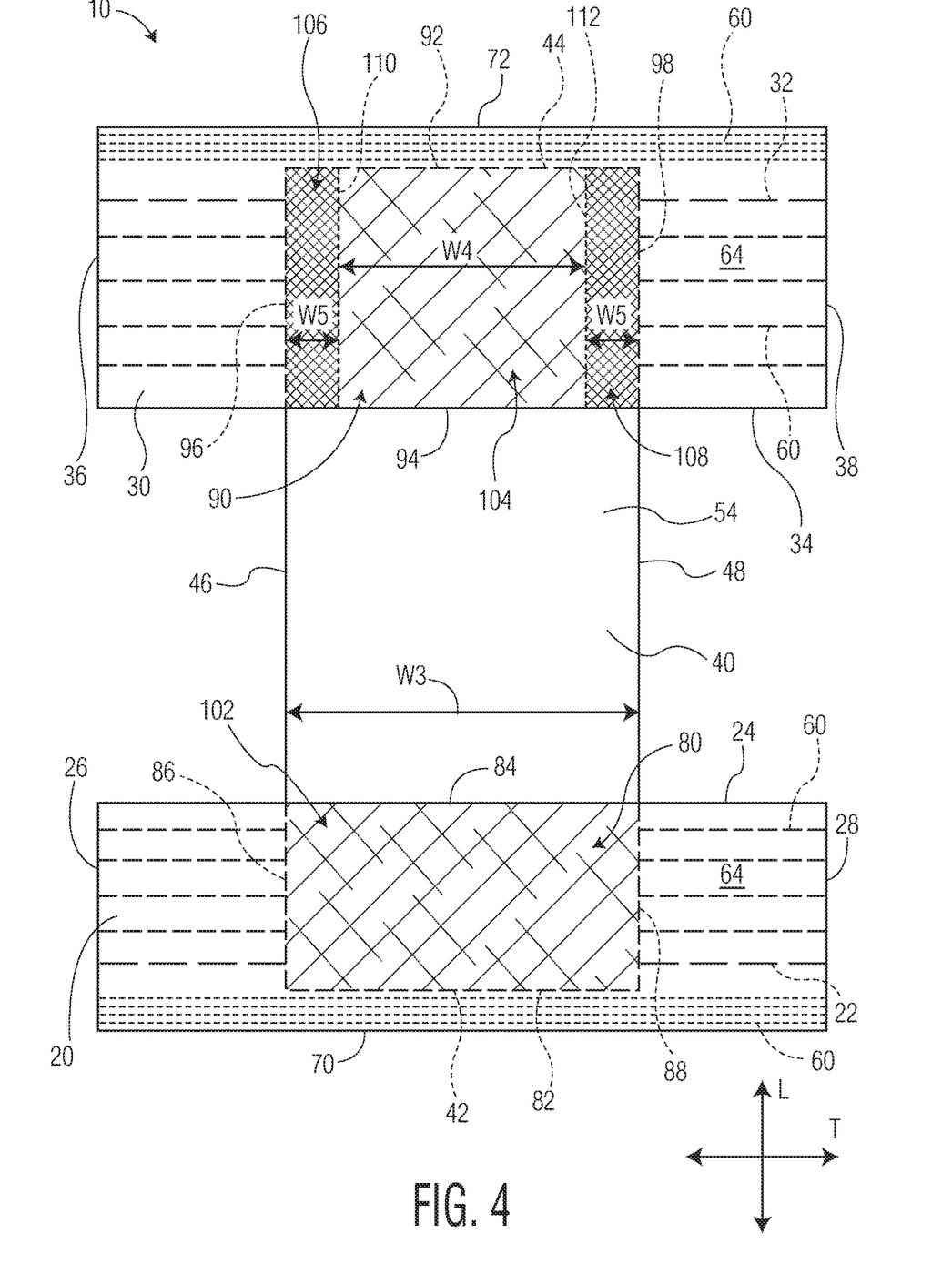
FIG. 4 is a bottom plan view of an embodiment of an absorbent article in an open, stretched, and laid flat configuration.

FIG. 4 provides a bottom plan view of an illustration of an embodiment of the absorbent article 10 in an open, laid-flat, and stretched configuration. As illustrated in FIG. 4, a portion of the first body panel 20 overlaps and is bonded to a first portion of the absorbent panel 40 forming a first region of attachment 80 and a portion of the second body panel 30 overlaps and is bonded to a second portion of the absorbent panel 40 forming a second region of attachment 90.

The first region of attachment 80 can be defined by a first transverse direction end edge 82 corresponding to the first transverse direction end edge 42 of the absorbent panel 40, a second transverse direction end edge 84 corresponding to a portion of the second transverse direction end edge 24 of the first body panel 20, a first longitudinal direction side edge 86 corresponding to a portion of the first longitudinal direction side edge 46 of the absorbent panel 40, and a second longitudinal direction side edge 88 corresponding to a portion of the second longitudinal direction side edge 48 of the absorbent panel 40. In various embodiments, in the first region of attachment 80 an adhesive may be utilized throughout the first region of attachment 80 to bond the backsheet layer 54 of the first portion of the absorbent panel 40 to a portion of the absorbent panel facing layer 66 of the first body panel 20. In various embodiments, the bonding of the first portion of the absorbent panel 40 to a portion of the first body panel 20 may provide a first region of attachment 80 having a first bond region 102 having a first bond strength.

The second region of attachment 90 can be defined by a first transverse direction end edge 92 corresponding to the second transverse direction end edge 44 of the absorbent panel 40, a second transverse direction end edge 94 corresponding to a portion of the second transverse direction end edge 34 of the second body panel 30, a first longitudinal direction side edge 96 corresponding to a portion of the first longitudinal direction side edge 46 of the absorbent panel 40, and a second longitudinal direction side edge 98 corresponding to a portion of the second longitudinal direction side edge 48 of the absorbent panel 40. In various embodiments, in the second region of attachment 90 adhesive may be utilized to bond the backsheet layer 54 of the second portion of the absorbent panel 40 to a portion of the absorbent panel facing layer 66 of the second body panel 30.

In various embodiments, the bonding of the second portion of the absorbent panel 40 to a portion of the second body panel 30 may provide a second region of attachment 90 having a first bond region 104 having a first bond strength. In various embodiments, the first bond strength of the first bond region 104 of the second region of attachment 90 can be the same as the first bond strength of the first bond region 102 of the first region of attachment 80. The first bond region 104 of the second region of attachment 90 can have a size dimension smaller than the second region of attachment 90. In various embodiments, the first bond region 104 can have a length in the longitudinal direction (L) which is the same as the length of the second region of attachment 90 in the longitudinal direction (L) but can have a width in the transverse direction (T) which is smaller than the width of the second region of attachment 90 in the transverse direction (T). In such embodiments, the first bond region 104 of the second region of attachment 90 can be centered in the transverse direction (T) of the second region of attachment 90 and can be defined by a portion of the first transverse direction end edge 92 of the second region of attachment 90, a portion of the second transverse direction end edge 94 of the second region of attachment 90, a longitudinal direction side edge 110 positioned inwardly from the first longitudinal direction side edge 96 of the second region of attachment 90 in the transverse direction (T), and a second longitudinal direction side edge 112 positioned inwardly from the second longitudinal direction side edge 98 of the second region of attachment 90 in the transverse direction (T). In such embodiments, the second region of attachment 90 can have a pair of second bond regions, 106 and 108, which are separated from each other in the transverse direction (T). Second bond region 106 can be defined by a portion of the first transverse direction end edge 92 of the second region of attachment 90, a portion of the second transverse direction end edge 94 of the second region of attachment 90, the longitudinal direction side edge 96 of the second region of attachment 90 and the longitudinal direction side edge 110 of the first bond region 104. Second bond region 108 can be defined by a portion of the first transverse direction end edge 92 of the second region of attachment 90, a portion of the second transverse direction end edge 94 of the second region of attachment 90, the longitudinal direction side edge 98 of the second region of attachment 90 and the longitudinal direction side edge 112 of the first bond region 104. An adhesive can be utilized to bond the backsheet layer 54 of the absorbent panel 40 to the absorbent panel facing layer 66 of the second body panel 30 in the second bond regions, 106 and 108. The second bond regions, 106 and 108, can have a bond strength greater than the bond strength of the first bond region 104.

In various embodiments, each of the first region of attachment 80 and the second region of attachment 90 can utilize the same adhesive to bond the backsheet layer 54 of the first and second portions of the absorbent panel 40 to the first body panel 20 and the second body panel 30. As the same adhesive can be utilized to bond the absorbent panel 20 to each of the first body panel 20 and the second body panel 30, to provide for differences in bond strength in the various bond regions of each of the first region of attachment 80 and the second region of attachment 90, the adhesive can be utilized in varying amounts. In various embodiments, the bond strength of the first bond region 102 of the first region of attachment 80 and the bond strength of the first bond region 104 of the second region of attachment 90 can be same. In each of the first bond region 102 of the first region of attachment 80 and the first bond region 104 of the second region of attachment 90, the adhesive can be present in an amount from about 0 or 1 gsm to about 2 or 3 gsm. In each of the second bond regions, 106 and 108, of the second region of attachment 90, the adhesive can be present in an amount from about 5, 6, or 7 gsm to about 8, 9, or 10 gsm. The amount of adhesive utilized in the second bond regions, 106 and 108, is greater than the amount of adhesive utilized in the first bond region 104 of the second region of attachment 90. When reconfiguring the absorbent article 10 from the wear configuration to the disposal configuration, the low presence of adhesive in the first bond region 104 in the second region of attachment 90 can allow for separation of the backsheet layer 54 of the absorbent panel 40 from the absorbent panel facing layer 66 of the second body panel 30 to form a pocket 100. The higher presence of adhesive in each of the second bond regions, 104 and 106, in the second region of attachment 90, however, will maintain the bond between the backsheet layer 54 of the absorbent panel 40 and the absorbent panel facing layer 66 of the second body panel 30 when the absorbent article 10 is reconfigured from the wear configuration to the disposal configuration. Maintaining the bond between the backsheet layer 54 of the absorbent panel 40 and the absorbent panel facing layer 66 of the second body panel 30 during the reconfiguration of the absorbent article 10 from the wear configuration to the disposal configuration will prevent complete separation of the second body panel 30 from the absorbent panel 40.

In various embodiments, multiple adhesives can be utilized to bond the backsheet layer 54 of the first and second portions of the absorbent panel 40 to each of the first body panel 20 and the second body panel 30. A first adhesive may be disposed in the first bond region 102 of the first region of attachment 80 and the first bond region 104 of the second region of attachment 90, The first adhesive may be a low-strength adhesive, such as a garment adhesive—sometimes termed a garment attachment adhesive or a garment positioning adhesive. In various embodiments, the peel strength of the first adhesive may be less than about 8, 6, 4, or 2 N. A second adhesive may be disposed in each of the second bond regions, 106 and 108, of the second region of attachment 90. The second adhesive may be a higher strength adhesive such as a construction adhesive or an elastic adhesive. Such higher strength adhesives may have relatively higher peel performance characteristics than the garment adhesives. In various embodiments, the peel strength of the second adhesive may be greater than 8, 10, or 12 N, When reconfiguring the absorbent article 10 from the wear configuration to the disposal configuration, the presence of a low peel strength adhesive in the first bond region 104 in the second region of attachment 90 can allow for separation of the backsheet layer 54 of the absorbent panel 40 from the absorbent panel facing layer 66 of the second body panel 30 to form a pocket 100.

The presence of a high peel strength adhesive in each of the second bond regions, 104 and 106, in the second region of attachment 90, however, will maintain the bond between the backsheet layer 54 of the absorbent panel 40 and the absorbent panel facing layer 66 of the second body panel 30 when the absorbent article 10 is reconfigured from the wear configuration to the disposal configuration. Maintaining the bond between the backsheet layer 54 of the absorbent panel 40 and the absorbent panel facing layer 66 of the second body panel 30 during the reconfiguration of the absorbent article 10 from the wear configuration to the disposal configuration will prevent complete separation of the second body panel 30 from the absorbent panel 40.

Each of the second bond regions, 106 and 108, of the second region of attachment 90 can have width W5 in the transverse direction (T) wherein the width W5 of each of the second bond regions, 106 and 108, can be at least 10, 12, or 14% of the total width W3 of the absorbent panel 40 wherein width W3 also corresponds to the width of the second region of attachment 90. Together, the second bond regions, 106 and 108, can have a total combined width of at least 20, 24, or 28% of the total width W3 of the absorbent panel 40 wherein width W3 also corresponds to the width of the second region of attachment 90. The first bond region 104 of the second region of attachment 90 can have a width W4 in the transverse direction (T) which can be smaller than the width W3 of the absorbent panel 40 wherein width W3 also corresponds to the width of the second region of attachment 90. In various embodiments, the width W4 of the first bond region 104 can be less than about 80, 76, or 72% of the total width W3 of the absorbent panel 40 wherein width W3 of the absorbent panel 40 also corresponds to the width of the second region of attachment 90.

Figure 5:
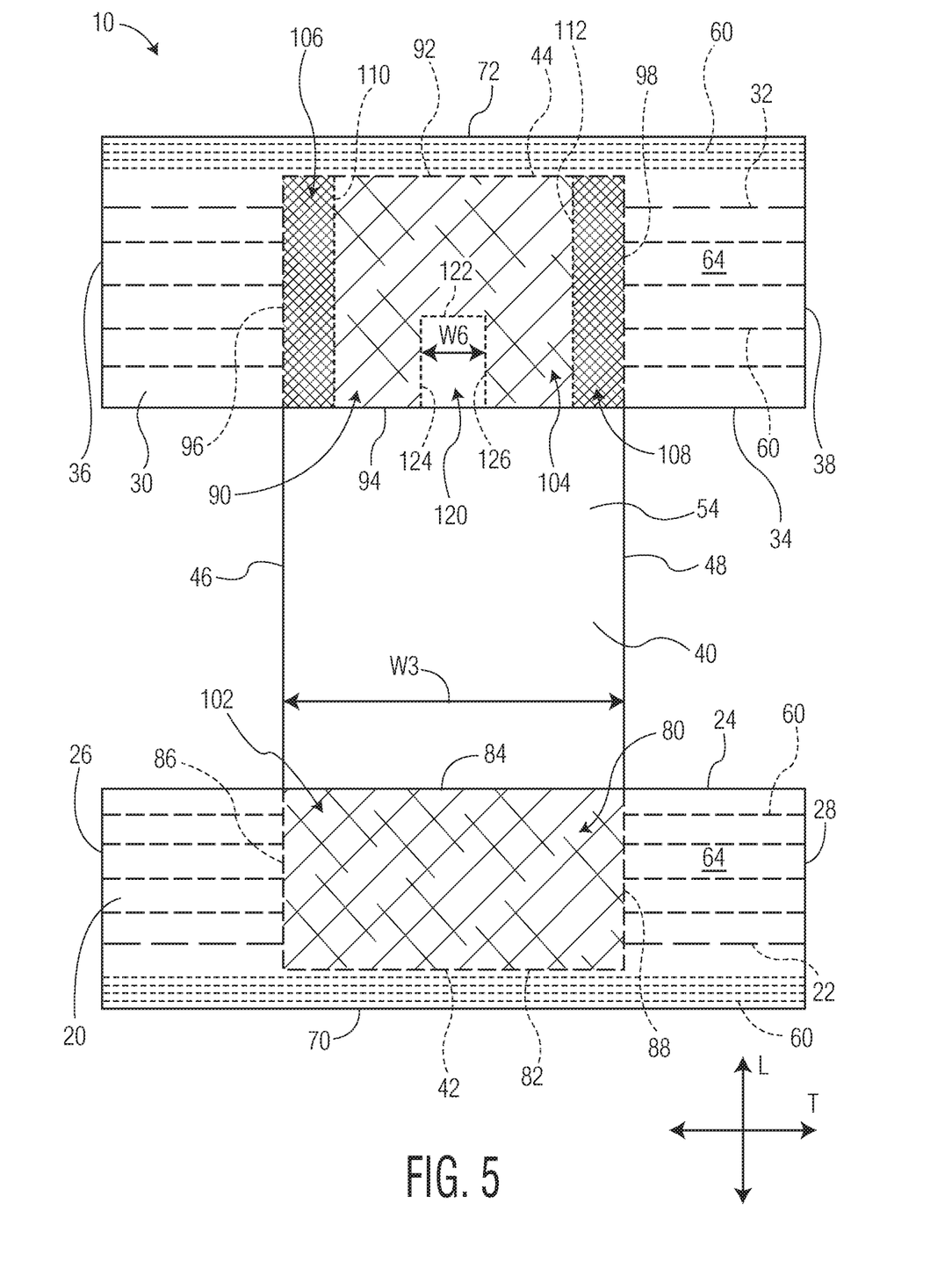
FIG. 5 is a bottom plan view of an embodiment of an absorbent article in an open, stretched, and laid flat configuration.

Referring to FIG. 5, in various embodiments, a region of attachment, such as, for example, the second region of attachment 90 illustrated in FIG. 5, may have an adhesive-free region 120. The adhesive-free region 120 may be positioned within the first bond region 104 of the second region of attachment 90. The adhesive-free region 120 can be defined by a first transverse direction end edge 122, a portion of the second transverse direction end edge 34 of the second body panel 30, a first longitudinal direction side edge 124 and a second longitudinal direction side edge 126. In general, the adhesive-free region 120 defines a region where there is no bonding between the backsheet layer 54 of the absorbent panel 40 and the absorbent panel facing layer 66 of the second body panel 34. The adhesive-free region 120 is illustrated as having a rectangular shape, but can have any suitable shape such as, but not limited to, square, triangle, trapezoidal, semi-circular, or semi-ovular shape. The adhesive-free region 120 can have any dimension deemed suitable to receive one or more fingers of a wearer in order to provide a location for easy starting of the separation of the backsheet layer 54 of the absorbent panel 40 from the absorbent panel facing layer 66 of the second body panel 30. In various embodiments, the adhesive-free region 120 can have a width W6 which can be from about 10 or 12% to about 14 or 16% of the total width W3 of the absorbent panel 40 wherein width W3 also corresponds to the width of the second region of attachment 90.

Figure 6:
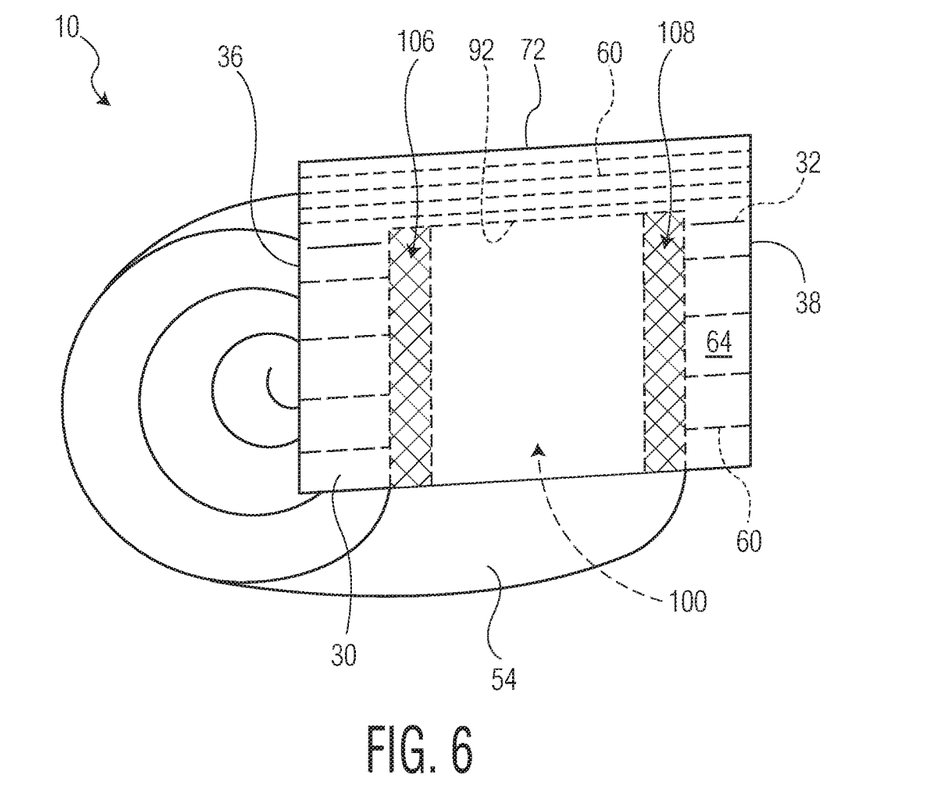
FIG. 6 is a perspective view of an embodiment of an absorbent article in a rolled configuration.
Figure 7:
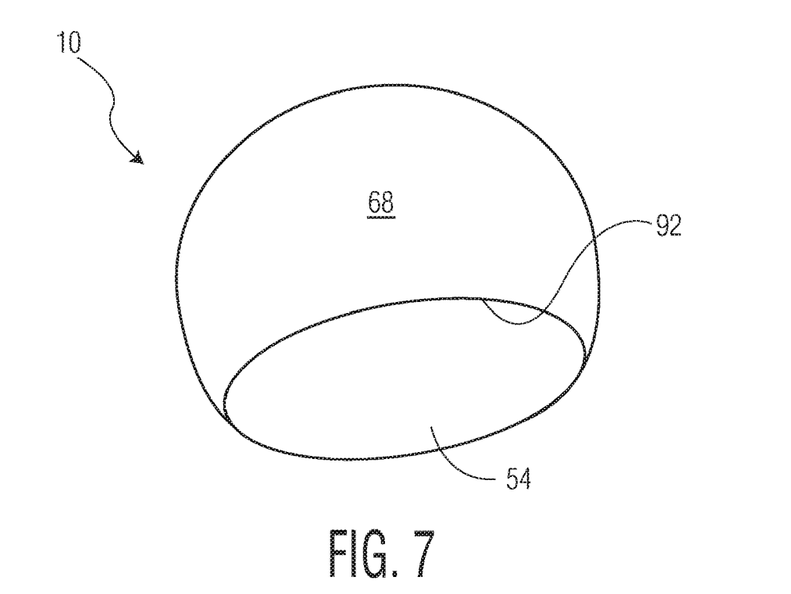
FIG. 7 is a perspective view of an embodiment of an absorbent article in a disposal configuration.

Following usage of the absorbent article 10, the wearer can separate the backsheet layer 54 of the absorbent panel 40 from the absorbent panel facing layer 66 of the second body panel 30 by breaking the adhesive attachment in the first bond region 104 in the second region of attachment 90. Breaking the adhesive attachment between the backsheet layer 54 of the absorbent panel 40 and the absorbent panel facing layer 66 of the second body panel 30 will form pocket 100. In order to maintain the bond between the second body panel 30 and the absorbent panel 40, the adhesive attachment between the backsheet layer 54 of the absorbent panel 40 and the absorbent panel facing layer 66 of the second body panel 30 should not be broken in the second bond regions, 106 and 108, in the second region of attachment 90. In various embodiments, the side seams, 12 and 14, which maintain the absorbent article 10 in a wear configuration can also be broken. As the width W3 of the absorbent panel 40 is less than 60, 55, or 52% of the width W1 of the first body panel 20 and less than 60, 55, or 52% of the width W2 of the second body panel 30, breaking of the side seams, 12 and 14, should have no impact on the second bond regions, 106 and 108, maintaining a bonding attachment between the absorbent panel 40 and the second body panel 30 or on the first bond region 102 maintaining a bonding attachment between the absorbent panel 40 and the first body panel 20. The absorbent article 10 can then be placed in a rolled configuration such as illustrated in FIG. 6. As illustrated in FIG. 6, the backsheet layer 54 of the absorbent panel 40 has been separated from the absorbent panel facing layer 66 of the second body panel 30 thereby breaking the first bond region 104 and forming the pocket 100 between the backsheet layer 54 of the absorbent panel 40 and the second body panel 30. The material of the second body panel 30 forming the pocket 100 can be inverted over the rolled absorbent article 10 such that the absorbent panel facing surface 68 of the absorbent panel facing layer 66 of the second body panel 30 is now on the exterior of the absorbent article 10 which is now in a disposal configuration such as illustrated in FIG. 7.

In the interests of brevity and conciseness, any ranges of values set forth in this disclosure contemplate all values within the range and are to be construed as support for claims reciting any sub-ranges having endpoints which are whole number values within the specified range in question. By way of hypothetical example, a disclosure of a range of from 1 to 5 shall be considered to support claims to any of the following ranges; 1 to 5; 1 to 4; 1 to 3; 1 to 2; 2 to 5; 2 to 4; 2 to 3; 3 to 5; 3 to 4; and 4 to 5.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm,".

All documents cited in the Detailed Description are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by references, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Many modifications and variations of the present disclosure can be made without departing from the spirit and scope thereof. Therefore, the exemplary embodiments described above should not be used to limit the scope of the invention.

What is claimed is:

1. An absorbent article characterized by comprising:
   a. a longitudinal direction and a transverse direction;
   b. a first body panel comprising:
      i. a first transverse direction end edge and a second transverse direction end edge;
      ii. a first longitudinal direction side edge and a second longitudinal direction side edge;
      iii. a first width in the transverse direction between the first longitudinal direction side edge and the second longitudinal direction side edge;
   c. a second body panel comprising:
      i. a third transverse direction end edge and a fourth transverse direction end edge;
      ii. a third longitudinal direction side edge and a fourth longitudinal direction side edge;
      iii. a second width in the transverse direction between the third longitudinal direction side edge and the fourth longitudinal direction side edge;
   d. an absorbent panel spanning between and connecting each of the first body panel and the second body panel, the absorbent panel comprising:
      i. a fifth transverse direction end edge and a sixth transverse direction end edge;
      ii. a fifth longitudinal direction side edge and a sixth longitudinal direction side edge;
      iii. a third width in the transverse direction between the fifth longitudinal direction side edge and the sixth longitudinal direction side edge, the third width smaller than the first width and the second width;
      iv. a topsheet layer, a backsheet layer, and an absorbent core positioned between the topsheet layer and the backsheet layer;
   e. a first region of attachment bonding a first portion of the backsheet layer of the absorbent panel to a first portion of the first body panel, the first region of attachment having a first bond region having a first bond strength;
   f. a second region of attachment bonding a second portion of the backsheet layer of the absorbent panel to a first portion of the second body panel, the second region of attachment having a second bond region having a second bond strength which is the same as the first bond strength, a third bond region having a third bond strength, and a fourth bond region having a fourth bond strength which is the same as the third bond strength, wherein the third bond strength and the fourth bond strength are each greater than the first bond strength and the second bond strength, and
   wherein the second bond region is disposed laterally between the third bond region and the fourth bond region.

2. The absorbent article of claim 1 wherein the first body panel is bonded to the second body panel at a first longitudinal direction side seam and a second longitudinal direction side seam.

3. The absorbent article of claim 2 wherein each of the first longitudinal direction side seam and the second longitudinal direction side seam are frangible.

4. The absorbent article of claim 1 wherein an adhesive is utilized to bond the first portion of the absorbent panel to the first portion of the first body panel and to bond the second portion of the absorbent panel to the first portion of the second body panel.

5. The absorbent article of claim 4 wherein the same adhesive is utilized in each of the first bond region, the second bond region, the third bond region, and the fourth bond region.

6. The absorbent article of claim 5 wherein the amount of adhesive present in each of the first bond region and the second bond region is from 0 gsm to 3 gsm.

7. The absorbent article of claim 5 wherein the amount of adhesive present in each of the third bond region and the fourth bond region is from 5 gsm to 10 gsm.

8. The absorbent article of claim 4 wherein a first adhesive is utilized in each of the first bond region and the second bond region and a second adhesive is utilized in each of the third bond region and the fourth bond region wherein the second adhesive is different from the first adhesive.

9. The absorbent article of claim 4 wherein the second region of attachment further comprises an adhesive-free region.

10. The absorbent article of claim 9 wherein the adhesive-free region has a sixth width which is at least 10% of the third width of the absorbent panel.

11. The absorbent article of claim 1 wherein the third width of the absorbent panel is less than 60% of the first width of the first body panel and less than 60% of the second width of the second body panel.

12. The absorbent article of claim 1 wherein the third bond region has a fourth width which is at least 10% of the third width of the absorbent panel and wherein the fourth bond region has a fifth width which is at least 10% of the third width of the absorbent panel.

\* \* \* \* \*